Patented Aug. 10, 1954

2,686,175

UNITED STATES PATENT OFFICE 2,686,175

THIAZOLE DISAZO DYESTUFFS

Raymond Gunst, Binningen, Switzerland, assignor to Ciba Limited, Basel, Switzerland, a Swiss firm No Drawing. Application February 2, 1953,
Serial No. 334,711

Claims priority, application Switzerland
August 25, 1949

7 Claims. (Cl. 260—146)

This application is a continuation in part of my copending application Serial No. 180,697, filed August 21, 1950. The present invention is based on the observation that the disazo dyestuffs of the formula (1)
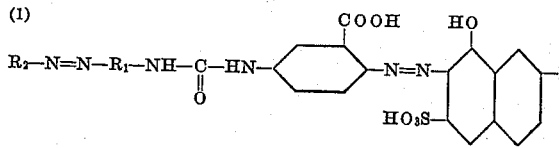

and the complex copper compounds thereof are very valuable dyestuffs. In the above Formula 1 $R_1$ represents a benzene radical containing the groups —N=N— and —NH— in para-position relatively to one another and $R_2$ represents a benzene radical containing a hydroxyl group in para-position with respect to the azo group and a carboxylic acid group in ortho-position to the hydroxyl group.

The disazo dyestuffs of the above Formula 1 are obtained by linking together by means of phosgene two monoazo dyes of the formulae (2) 

and (3)
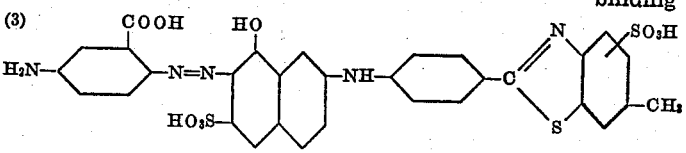

In the Formula 2 $R_1$ and $R_2$ have the meaning already given and monoazo dyestuffs of this compositon are known products. As examples there may be mentioned in this connection: 4-amino-4'-hydroxy-1:1'-azobenzene-3'-carboxylic acid, 4-amino-2-chloro-4'-hydroxy-1:1'-azobenzene-3'-carboxylic acid, 4-amino-4'-hydroxy-1:1'-azobenzene-3:3'-dicarboxylic acid, 4-amino-4'-hydroxy-5'-methyl-1:1'-azobenzene-3'-carboxylic acid, 4-amino-5-methoxy-2-methyl-4'-hydroxy-1:1'-azobenzene-3'-carboxylic acid-5'-sulfonic acid.

The monoazo dyestuff of the Formula 3 can be obtained by coupling diazotized 5-nitro-2-aminobenzoic acid with 2-[4'-(8''-hydroxynaphthyl-[2'']-aminophenyl)]-6-methylbenzthiazole-X:6''-disulfonic acid and reducing the nitro group to the —NH$_2$— group. A method for the preparation of the 2-[4'-8''-hydroxynaphthyl-[2'']-aminophenyl)]-6-methylbenzthiazole-X:6''-disulfonic acid corresponding to the formula (4)
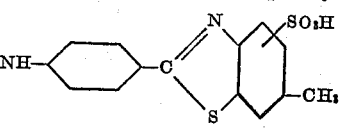

is given in Example 1 below.

The condensation of the amino-monoazo dyestuffs of the Formulae 2 and 3 to form the asymmetrical urea derivatives by means of phosgene is advantageously conducted in an aqueous medium, preferably with the addition of an acid-binding agent, for example, an alkali carbonate, alkali acetate or an alkali ortho-phosphate or pyrophosphate.

On account of their good substantivity the dyestuffs obtainable according to the present invention are especially valuable for the dyeing of cellulosic fibers as for example linen, cotton, artificial silk or staple fiber of regenerated cellulose. The dyestuffs may be treated in substance or on the fiber with agents providing metal, especially copper. The treatment with the agents providing metal may be carried out in the customary manner known per se.

Treatment with agents yielding copper in substance may be of advantage when the complex copper compounds possess sufficient solubility for application in the dyebath. It is preferably carried out in an acid medium and with a quantity of the agent providing copper which corresponds to one gram atom of copper or only a slight excess over it per molecular proportion of dyestuff. The so obtained cupriferous dyestuffs correspond to the formula (5)
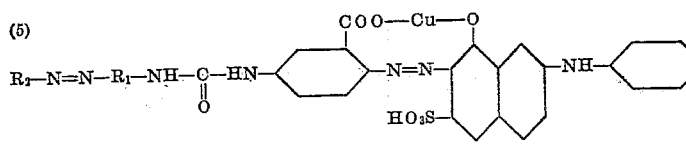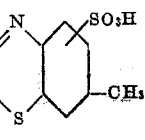

in which $R_1$ and $R_2$ have the meanings already given.

With regard to the formulae of the cupriferous dyestuffs it should be explained that these formulae undoubtedly represent the correct stoichiometric quantities of copper and the correct position of the copper atom in the complex, but the distribution of the main and secondary valences in the complex union of the copper has not yet been established with certainty.

Also when the solubility is sufficient, but especially when the dyestuffs do not contain sufficient solubilizing groups, so that their complex metal compounds are less suitable for dyeing, the treatment can be carried out with agents providing metal, especially copper, with advantage on the fiber or in one bath partly in the dyebath and partly on the fiber, as is described for example in U. S. Patent No. 2,148,659. In many cases also very valuable dyeings are obtained by working according to the process in which the dyeings produced with the metal-free dyestuffs are after-treated with such aqueous solutions as contain on the one hand basic formaldehyde condensation products from compounds containing in the molecule at least once the atom grouping

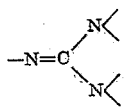

or, as in the case for example of cyanamide, are easily capable of conversion into such compounds, and on the other hand water-soluble metal compounds, especially complex copper compounds.

The dyeings obtainable with the new dyestuffs on cellulosic fibers are as a rule distinguished by good fastness to washing and primarily by very good fastness to light.

The following examples illustrate the invention, the parts and percentages being by weight unless otherwise stated and the relation between parts by weight and parts by volume being the same as that between the kilogram and the liter.

*Example 1*

18.2 parts of 5-nitro-2-aminobenzoic acid are diazotized in the known manner. Meanwhile 55 parts of 2-[4'-(8''-hydroxynaphthyl-[2''']-aminophenyl)] - 6 - methyl-benzthiazole-X:6''-disulfonic acid are dissolved in 200 parts of water with the addition of 50 parts of a 30 per cent. ammonium hydroxide solution and then at 0° C. the diazotized 5-nitro-2-aminobenzoic acid is added to this solution with stirring. When the monoazo coupling is complete after several hours stirring, the coupling mixture is heated to 50° C. without dilution and there is added with stirring a concentrated aqueous solution of 42 parts of crystalline sodium sulfide. Owing to the reaction the temperature rises to 58° C. Heating for a further hour is carried out at 75° C. and then the whole is carefully acidified with hydrochloric acid and filtered. The aminoazo dyestuff formed is freed from sulfur residues by dissolving to a dilute aqueous solution in the presence of weak alkali and separated with sodium chloride, filtered off and dried.

14.1 parts of the aminoazo dyestuff thus produced are dissolved in 2000 parts of water together with 6.4 parts of the sodium salt of 4-amino - 4' - hydroxy-1:1'-azobenzene-3'-carboxylic acid, to the solution 20 parts of sodium carbonate added and phosgene introduced at 30-35° C. with stirring until no free amino group can any longer be detected. The unsymmetrical urea formed, which corresponds to the formula

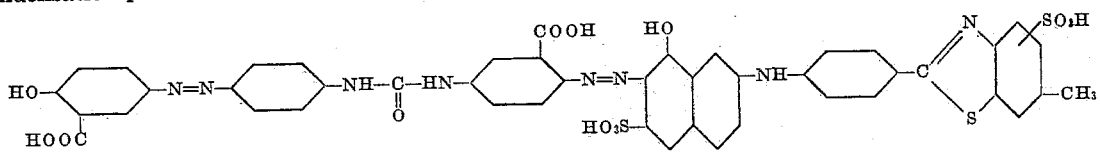

is filtered off, dissolved in aqueous solution alkaline with sodium carbonate and precipitated by means of sodium chloride in the form of the sodium salt. The new dyestuff forms a dark powder which dissolves in water with an olive color and dyes cotton by the single-bath or two-bath after-coppering process in brown-olive shades of good fastness to washing and light.

Similar dyestuffs are obtained when in the reaction with phosgene 4-amino-2-chloro-4'-hydroxy-1:1'-azobenzene-3'-carboxylic acid or 4-amino-4'-hydroxy-5'-methyl-1:1'-azobenzene-3'-carboxylic acid or 4-amino-5-methoxy-2-methyl-4'-hydroxy-1:1'-azobenzene-3'-carboxylic acid 5'-sulfonic acid is used instead of 4-amino-4'-hydroxy-1:1'-azobenzene-3'-carboxylic acid. The so-obtained dyestuffs correspond to the following formulae

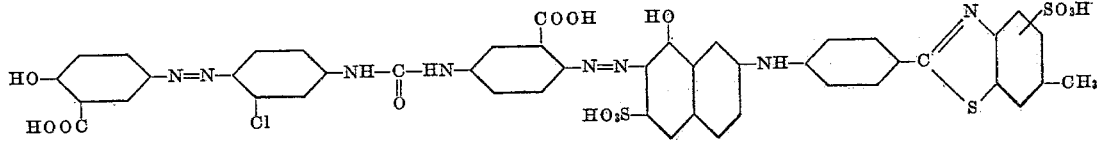

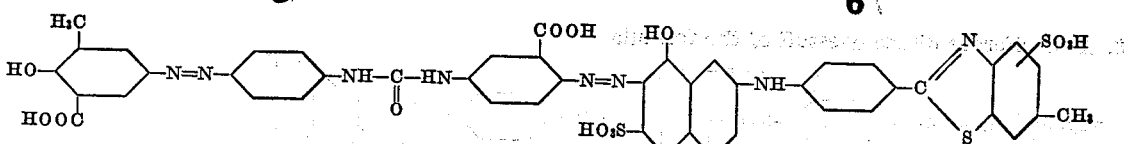

and

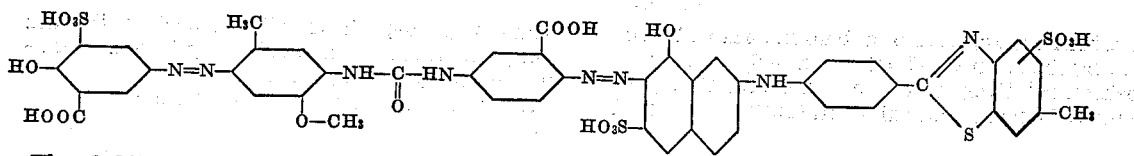

The 2-[4'-(8''-hydroxynaphthyl-[2'']-aminophenyl)]-6-methyl-benzthiazole-X:6''-disulfonic acid used as starting material in this example can be produced as follows:

24.0 parts of 1:7-dihydroxynaphthalene-3-sulfonic acid are suspended in 500 parts of commercial sodium bisulfite solution. At 95° C., 46 parts of 2 - (4' - aminophenyl) - 6 - methyl-

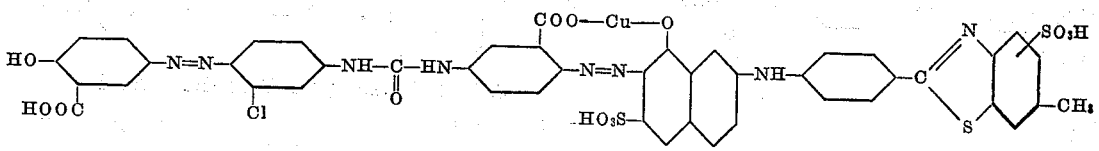

benzthiazole-X-sulfonic acid (obtained by sulfonation of 2 - (4' - aminophenyl) - 6 - methyl-benzthiazole with fuming sulfuric acid) are introduced and the reaction mixture is maintained for 60 hours with stirring and reflux cooling at 95–97° C. After cooling, the condensation product which is difficultly soluble in acid solution, is filtered off. For purification the filter residue is dissolved in the hot in a medium alkaline with sodium carbonate and freed from any insoluble residue by filtration. By addition of dilute hydrochloric acid the condensation product is precipitated as an orange-brown deposit. If desired the condensation product can be freed from sulfurous acid by heating the suspension, until the sulfurous acid has completely evaporated.

Example 2

10 parts of the unsymmetrical urea prepared according to Example 1 and corresponding to the formula

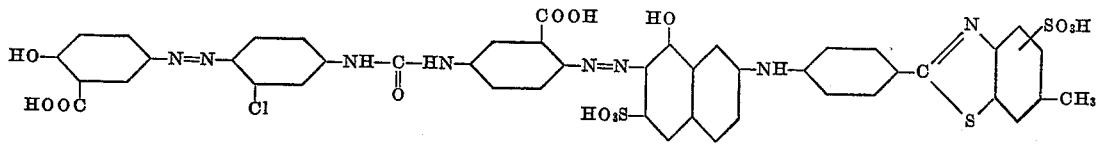

are dissolved in 500 parts of hot water. This solution is acidified to Congo red reaction by the addition of sulfuric acid and 5 parts of crystallized copper sulfate, dissolved in 50 parts of water, are added. The mixture is well stirred and heated up to 90° C. and maintained at this temperature for an hour. The complex copper compound thus formed is filtered off and converted to its sodium salt by redissolving in aqueous alkaline solution with sodium carbonate and precipitating the new copper-containing dyestuff by means of sodium chloride. The resulting dyestuff of the formula

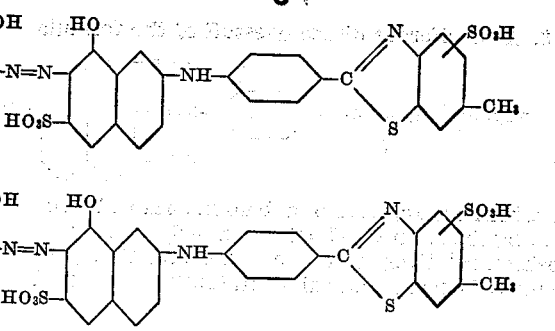

forms a dark powder which dissolves in water with an olive coloration and dyes cotton dark-olive shades of good fastness to washing and light.

What I claim is:

1. A disazo dyestuff selected from the group consisting of the compounds of the formula

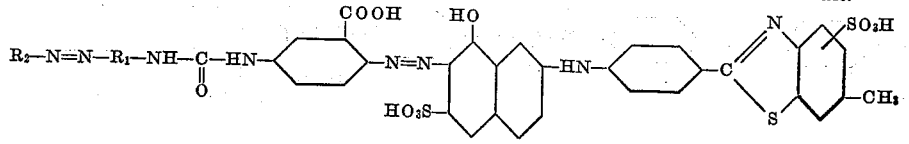

and their complex copper compounds, in which formula $R_1$ represents a benzene radical containing the groups —N=N— and —NH— in para-position relatively to one another and $R_2$ represents a benzene radical containing a hydroxyl group in para-position with respect to the azo group and a carboxylic acid group in ortho-position to the hydroxyl group.

2. A disazo dyestuff of the formula

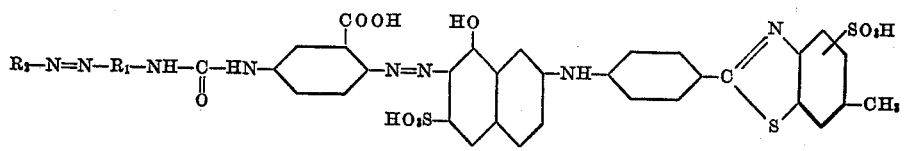

in which $R_1$ represents a benzene radical containing the groups —N=N— and —NH— in para-position relatively to one another and $R_2$ represents a benzene radical containing a hydroxyl group in para-position with respect to the azo group and a carboxylic acid group in ortho-position to the hydroxyl group.

3. A cupriferous disazo dyestuff of the formula

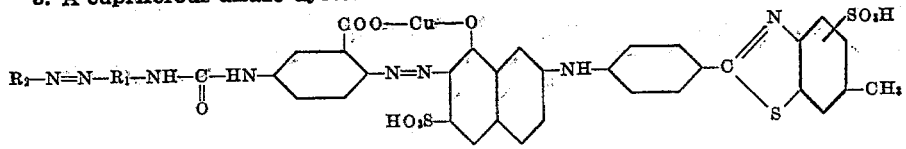

in which $R_1$ represents a benzene radical containing the groups —N=N— and —NH— in para-position relatively to one another and $R_2$ represents a benzene radical containing a hydroxyl group in para-position with respect to the azo group and a carboxylic acid group in ortho-position to the hydroxyl group.

4. The disazo deystuff of the formula

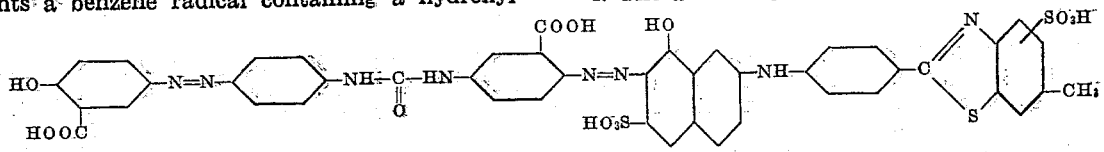

5. The disazo dyestuff of the formula

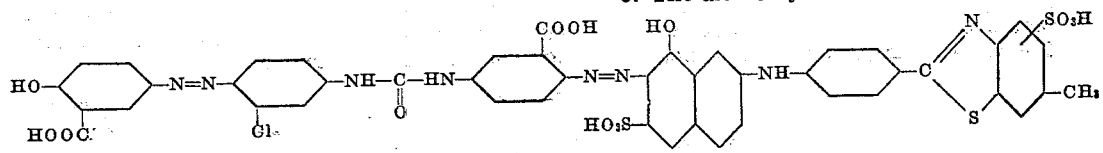

6. The disazo dyestuff of the formula

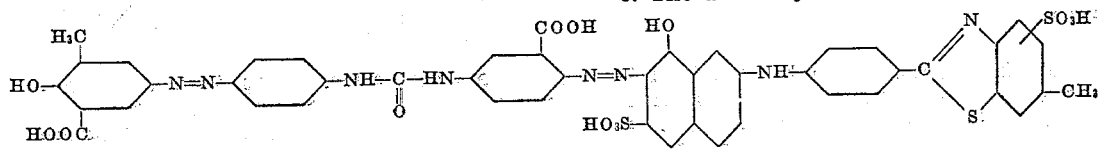

7. The cupriferous disazo dyestuff of the formula

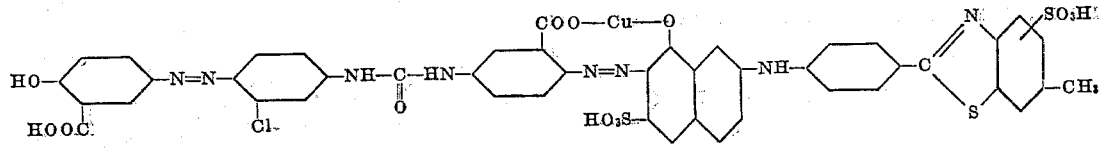

No references cited.